United States Patent
Jutzi et al.

(10) Patent No.: US 10,408,695 B2
(45) Date of Patent: Sep. 10, 2019

(54) PIEZORESISTIVE POSITION SENSOR SYSTEMS

(71) Applicant: TRUMPF Schweiz AG, Gruesch (CH)

(72) Inventors: Fabio Jutzi, Chur (CH); Dara Bayat, Neuchaetel (CH); Sebastien Lani, Courtepin (CH)

(73) Assignee: TRUMPF Schweiz AG, Gruesch (CH)

( * ) Notice: Subject to any disclaimer, the term of this patent is extended or adjusted under 35 U.S.C. 154(b) by 239 days.

(21) Appl. No.: 15/414,751

(22) Filed: Jan. 25, 2017

(65) Prior Publication Data

US 2017/0131162 A1     May 11, 2017

Related U.S. Application Data

(63) Continuation of application No. PCT/EP2015/066925, filed on Jul. 23, 2015.

(30) Foreign Application Priority Data

Jul. 25, 2014    (EP) ..................................... 14178608

(51) Int. Cl.
    *G01L 5/00*         (2006.01)
    *G02B 26/08*      (2006.01)

(52) U.S. Cl.
    CPC ........ *G01L 5/0019* (2013.01); *G02B 26/0833* (2013.01)

(58) Field of Classification Search
    None
    See application file for complete search history.

(56) References Cited

U.S. PATENT DOCUMENTS

| | | | |
|---|---|---|---|
| 6,075,585 A | 6/2000 | Minne et al. | |
| 7,242,273 B2 * | 7/2007 | Isobe | H01H 59/0009 200/181 |
| 7,556,775 B2 | 7/2009 | McGill et al. | |
| 8,559,086 B2 * | 10/2013 | Davis | G02B 26/0833 359/200.8 |

(Continued)

FOREIGN PATENT DOCUMENTS

| | | |
|---|---|---|
| CN | 1982201 | 6/2001 |
| CN | 101419227 | 4/2009 |

(Continued)

OTHER PUBLICATIONS

International Search Report from corresponding PCT Application No. PCT/EP2015/066925, dated Nov. 4, 2015, 3 pages.

(Continued)

*Primary Examiner* — Peter J Macchiarolo
*Assistant Examiner* — Jermaine L Jenkins
(74) *Attorney, Agent, or Firm* — Fish & Richardson P.C.

(57) ABSTRACT

This disclosure relates to systems that include a substrate and a platform connected to the substrate by at least one flexure hinge. The platform is movable relative to the substrate. The systems also include at least one position sensor having a plurality of piezoresistive elements that are connected to one another so as to form an electrical bridge. One of the piezoresistive elements of the plurality of piezoresistive elements is positioned on the at least one flexure hinge. At least one other piezoresistive element of the plurality of piezoresistive elements is positioned on at least one of the substrate and the platform.

14 Claims, 2 Drawing Sheets

(56) References Cited

U.S. PATENT DOCUMENTS

| | | | |
|---|---|---|---|
| 9,034,666 B2* | 5/2015 | Vaganov | G01L 5/162 |
| | | | 324/750.01 |
| 9,470,503 B2* | 10/2016 | Gerson | G01B 7/003 |
| 2006/0125597 A1* | 6/2006 | Kamiya | G02B 26/0833 |
| | | | 338/171 |
| 2009/0039908 A1 | 2/2009 | Ikeuchi et al. | |
| 2010/0195180 A1* | 8/2010 | Akanuma | G02B 26/0858 |
| | | | 359/200.8 |
| 2011/0199284 A1 | 8/2011 | Davis et al. | |
| 2013/0003026 A1 | 1/2013 | Rothaar | |

FOREIGN PATENT DOCUMENTS

| | | |
|---|---|---|
| CN | 101424879 | 5/2009 |
| CN | 102768291 A | 11/2012 |
| JP | H 10-073506 | 3/1998 |
| JP | 2002-036198 | 2/2002 |
| JP | 2005-326465 | 11/2005 |
| JP | 2006-242757 | 9/2006 |
| JP | 2007-025608 | 2/2007 |
| JP | 2007-326205 | 12/2007 |
| JP | 2008-040460 | 2/2008 |
| JP | 2009-180967 | 8/2009 |
| JP | 2009-246028 | 10/2009 |
| JP | 2010-288249 | 12/2010 |
| JP | 2012-068309 | 4/2012 |
| WO | WO2011062489 A1 | 5/2011 |

OTHER PUBLICATIONS

Thaysen et al., "Atomic force microscopy probe with piezoresistive read-out and a highly symmetrical Wheatstone bridge arrangement", Sensors and Actuators, vol. 83, 2000, pp. 47-53.

Office Action in Chinese Application No. 201580041133.6, dated Oct. 25, 2018, 16 pages (with English translation).

* cited by examiner

PIEZORESISTIVE POSITION SENSOR SYSTEMS

CROSS-REFERENCE TO RELATED APPLICATIONS

This application is a continuation of and claims priority under 35 U.S.C. § 120 to PCT Application No. PCT/EP2015/066925 filed on Jul. 23, 2015, which claims priority to European Application No. 14 178 608.7, filed on Jul. 25, 2014. The entire contents of these priority applications are incorporated herein by reference.

TECHNICAL FIELD

The invention relates to systems comprising a position sensor including piezoresistive elements connected so as to form an electrical bridge.

BACKGROUND

Reducing the size of systems and components can advantageously impact laser machining processes. One possibility for saving space is to use scanners comprising just one mirror that is based on MEMS (microelectromechanical systems) technology. In general, these mirrors are used in arrays for large deflection mirrors or are incorporated into simple deflection systems. The mirrors usually have to tilt about just one axis and have a small deflection angle. To cover a working region that is appropriate for laser machining, the mirrors used generally have to achieve significant deflection angles and must be able to be deflected in two spatial directions. These deflection angles can be 10° or more. Furthermore, these mirrors must reach a specific deflection angle at a specific point in time, and must therefore be very precisely controlled. The deflection of the mirrors can be achieved by means of flexure hinges. A flexure hinge is understood to mean a region of a component that permits relative movement (rotation) between two rigid body regions by means of bending. Flexure hinges are often formed as spring elements. However, the use of flexure hinges can be accompanied with the problem of oscillation in a third spatial direction, which has to be taken into account during positioning. Exact and rapid position determination in all three spatial directions is necessary for precisely controlling the mirrors.

U.S. Pat. No. 8,559,086 discloses a system comprising a position sensor. In the position sensor system of U.S. Pat. No. 8,559,086, the entire piezoresistive sensor, i.e. the four piezoresistive elements, is arranged on flexure hinges. In view of this and in view of the rigidity of the system the flexure hinges are relatively large and large deflections (+/−10°) are therefore limited.

SUMMARY

Various embodiments disclosed herein provide piezoresistive position sensor systems that permit precise position determination.

In one aspect, the disclosure provides systems that include a substrate and a platform connected to the substrate by at least one flexure hinge. The platform is movable relative to the substrate. The systems also include at least one position sensor having a plurality of piezoresistive elements that are connected to one another so as to form an electrical bridge. One of the piezoresistive elements of the plurality of piezoresistive elements is positioned on the at least one flexure hinge. At least one other piezoresistive element of the plurality of piezoresistive elements is positioned on one of the substrate and the platform. It is thus provided, according to the invention, not for the entire position sensor to be arranged on the flexure hinge(s), but rather for at least one piezoresistive element that is part of the position sensor to be arranged on the platform or the substrate, i.e., on a rigid body region. This placement makes it possible to reduce the space requirements of the position sensor on the flexure hinge, with the result that the flexure hinge can be made smaller. In addition, it is possible for a single piezoresistive element to be able to occupy almost the entire width of the flexure hinge. As a result, the piezoresistive element can be formed so as to be large enough that noise is kept low.

In certain implementations, the piezoresistive elements of at least one position sensor, e.g., of all position sensors, are advantageously formed so as to be identical.

In some implementations, exactly one piezoresistive element is positioned on the flexure hinge and three piezoresistive elements are positioned on the rigid body region. The four piezoresistive elements are connected so as to form a Wheatstone bridge. Three piezoresistors are thus attached to an undeformable part of the structure. When the platform moves, the flexure hinge deforms, which leads to a change in the mechanical stress and thus to a change in the piezoresistive elements, and results in a change in the resistance. The output signal of the Wheatstone bridge thus changes. The position change can be determined on the basis of the output signal. The output signal (a voltage) can be generated at two contacts of the Wheatstone bridge by supplying the bridge with a constant current at two further contacts, or by applying a constant voltage to the two further contacts.

In certain implementations, at least one piezoresistive element can be made of doped crystalline or polycrystalline semiconductor material. As a result, it is possible to form the piezoresistive elements by local doping, for example p-doping, of crystalline silicon. Alternatively, the piezoresistive elements can be produced by doping polycrystalline semiconductor material, in particular polycrystalline silicon. In this case, a polycrystalline layer can be applied above an insulation layer by thin-film technology and doped. The advantage of piezoresistive elements made of polycrystalline material is that the piezoresistive elements are less light-dependent.

In various implementations, the piezoresistive elements can be connected to analysis electronics by a metal layer.

In certain implementations, the semiconductor layer can be doped more highly at the contacts between the piezoresistive elements and the metal, in order to achieve an ohmic contact resistance. The piezoresistive elements can be doped before a step of etching the semiconductor material.

In a semiconductor crystal, the piezoresistive coefficients are direction-dependent. Accordingly, in some implementations, the piezoresistive elements are therefore positioned so as to be at a 90° angle to one another, such that the piezoresistive coefficients of the individual elements are similar or identical as far as possible.

In various implementations, at least one piezoresistive element can be U-shaped. The cut-out region between the two arms of the U can be produced by etching in order to prevent a short circuit, either across the undoped regions or due to too wide a diffusion of the doped regions. The flexure hinges can be in two parts at the position of the U-shaped piezoresistive elements.

In some implementations, at least one piezoresistive element can be covered by a light-proof layer. This light-proof layer can be a metal layer, for example, which reflects radiation, in particular laser light, or can be another layer that absorbs the radiation, for example laser radiation. As a result, the light-sensitivity of the position sensor is reduced or the influence of light is may even be excluded. Heating, and therefore temperature-dependency, of the position sensor can also be largely prevented.

In various implementations, at least one temperature sensor can be arranged on the substrate or on the platform. In this case, the temperature sensor is arranged as close as possible to the piezoresistive elements of a position sensor. Since the piezoresistive elements are sensitive to temperature, it is advantageous to be able to detect the temperature in order to then be able to compensate for a temperature drift. The temperature sensor can be formed as a metal resistor on the substrate or on the platform close to the piezoresistive elements, for example.

In certain implementations, the systems can be arranged or formed on a silicon-on-insulator (SOI) substrate. In particular, the platform, together with the flexure hinges, can be produced in a silicon-on-insulator wafer by means of etching. In this case, the layer below the flexure hinges and the platform is removed by etching. Trenches can be etched around the piezoresistive elements on the substrate and on the platform, through the top layer (also referred to as the device layer) of the SOI wafer, in order to further improve the electrical insulation of the elements.

In some implementations, a plurality of flexure hinges can be provided, which hinges can be arranged around the periphery of the platform. In particular, a number of flexure hinges that is divisible by two and/or by four, without a remainder, and two or four, position sensors uniformly arranged around the platform can be provided. In particular, just two position sensors can be provided when there is a number of flexure hinges that is divisible by four without a remainder. It is thus possible to measure the position of a platform in three degrees of freedom (x-tilt, y-tilt, z-lift) using piezoresistive sensors. In the rest position, the platform is in parallel with an xy-plane and is held by the flexure hinges, which are also arranged in parallel with the xy-plane. When the platform moves, the flexure hinges deform, resulting in a change in the mechanical stress of piezoresistive elements arranged on the flexure hinges, which in turn results in a change in resistance. The piezoresistive elements of a position sensor can be interconnected in the manner of a Wheatstone bridge.

In various implementations, four flexure hinges can each comprise one piezoresistive element, respectively. According thereto, four position sensors are provided, the piezoresistive elements of which are in each case connected so as to form a Wheatstone bridge, each of the four piezoresistive elements on the flexure hinges being connected to three other piezoresistive elements, respectively, on a solid region, so as to form a Wheatstone bridge. The output signals of the Wheatstone bridges can be offset against one another in order to determine the position of the platform in three degrees of freedom.

In certain implementations, the four flexure hinges are arranged around the platform at 90° to one other in each case. This means that, in the event of tilting purely about one axis, the output signals of opposing Wheatstone bridges each have the same value, but different polarity signs. The tilting direction can be determined on the basis of the relationship of the signals from two sensor pairs. The degree of tilting can be determined from this value. When there is purely a z-lifting movement, this means that the signals of all four Wheatstone bridges have the same value and the same polarity sign. In addition, the Wheatstone bridges should each have the same wiring. In the event of simultaneous lifting and tilting, the position can be determined in three degrees of freedom from the four output signals of the Wheatstone bridges.

In certain implementations, the position of the piezoresistive elements on the flexure hinges are identical. The piezoresistive elements of a bridge can also be identical and the bridges can also be identical.

In various implementations, it is advantageous for the piezoresistive elements to be arranged at the same point on uniform flexure hinges to obtain a precise position determination.

The piezoresistive elements can be arranged on the platform side or on the substrate side of the flexure hinges.

In certain implementations, the piezoresistive elements are attached at a point of the flexure hinges where the hinges have the greatest mechanical stress when deformed. This point is usually at the end of the flexure hinge that is connected to the platform or the substrate. The greatest mechanical stress can also be at any other point, for example in the center of the flexure hinge. This depends on the design of the flexure hinges.

In implementations where a piezoresistive element is arranged on the substrate side of a flexure hinge, the three further piezoresistive elements of the Wheatstone bridge on the substrate can be positioned as close as possible to the first piezoresistive element on the flexure hinge, so that the temperature of the piezoresistive elements is as similar as possible.

In implementations where a piezoresistive element is arranged on the platform-side end of a flexure hinge, the three further piezoresistive elements of the Wheatstone bridge on the platform can be positioned as close as possible to the flexure hinge, so that the temperature of all the piezoresistive elements is as similar as possible.

In certain implementations, at least one connecting line to a piezoresistive element positioned on the platform can extend over a flexure hinge. If, accordingly, a piezoresistive element is arranged on the platform, the electrical connection thereto can be routed over a flexure hinge. In this case, at least two connecting lines can be positioned on a flexure hinge. When a plurality of lines extends over one flexure hinge, the system becomes less sensitive to electromagnetic fields.

In various implementations, a connecting line to a piezoresistive element arranged on a flexure hinge is routed over an adjacent flexure hinge and the platform or the substrate. A piezoresistive element should be made as large as possible. In particular, a piezoresistive element can occupy the entire width or substantially the entire width of the flexure hinge. Thus, only one line can be routed on the flexure hinge. However, two connecting lines are required in order to connect the piezoresistive element. The second line required can be routed on an adjacent solid element and over the platform or the substrate.

In certain implementations, a mirror can be arranged on the platform. In this case, the system can be used for directing a laser beam.

In some implementations, a magnet or a magnetisable material is be arranged below the platform, and at least one coil can be provided in the region of the magnet or of the magnetisable material. A magnetic field can be generated by the coil, which field then interacts with the magnet or the magnetisable material and can thus deflect the platform. In particular, the platform can be tilted and/or moved in the z-direction.

In certain implementations, a measuring device and an analysis device can be provided for measuring and analyzing the signals of the position sensors. The position or location of the platform can thus be detected using the measuring device and the analysis device.

Further features and advantages of the invention will emerge from the following description of embodiments of the invention, given on the basis of the drawings that show details that are essential to the invention, and from the claims. In a variant of the invention, the individual features can either be implemented separately in each case or be grouped together in any desired combination.

Various embodiments of the invention are shown schematically in the drawings and will be explained in further detail below with reference to the drawings.

DETAILED DESCRIPTION

Figure 1:
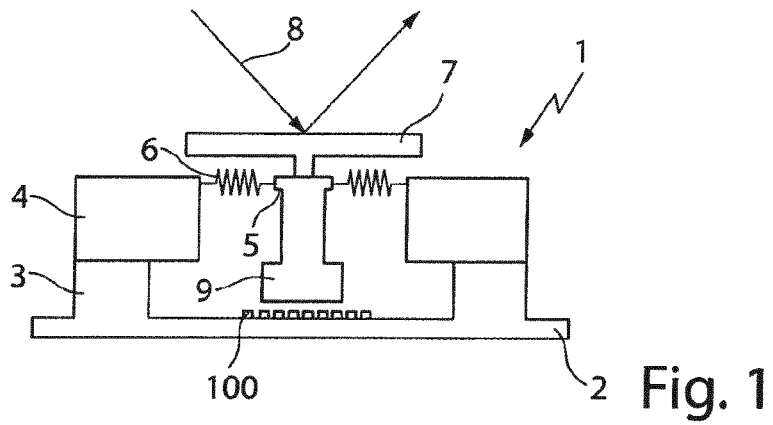
FIG. 1 is a schematic cross-sectional view through a system according to the invention.

FIG. 1 is a schematic cross-sectional view of a system 1 according to the invention. A spacer 3, which can be formed as an electrically insulating layer, is arranged on a layer 2 made of ceramic or of a circuit board material. A substrate 4 made of a semiconductor material is in turn arranged on the spacer. A platform 5 is connected to the substrate 4 by means of flexure hinges 6. A mirror 7 is arranged on the platform 5, at which mirror laser beams 8 can be reflected. A magnet 9 is provided at the lower end of the platform 5. One or more coils 100 are arranged below the magnet. The coils 100 can generate magnetic fields that cause the magnet 9, and thus the platform 5 and subsequently the mirror 7, to move. In particular, the platform 5 can be moved thereby. The magnet 9 can include a permanent magnet or can include a magnetisable material (i.e. a material capable of being magnetized, such as a ferromagnetic material) or capable of having a magnetic field generated through it, such as iron, nickel, cobalt, and some alloys of rare earth metals).

Figure 2:
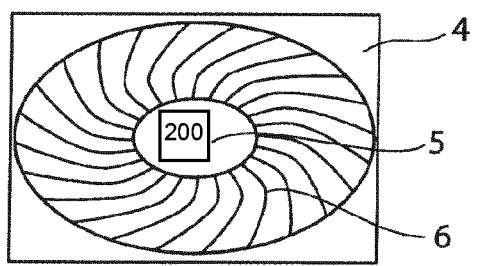
FIG. 2 is a plan view of a platform that is connected to a substrate by means of flexure hinges.

FIG. 2 is a plan view of the system 1, without the mirror 7 being shown. It can be seen here that the platform 5 is connected to the substrate 4 by means of a plurality of slightly bent flexure hinges 6. The slightly bent flexure hinges 6 are bent when in a relaxed state (i.e., when not extended). It can further be seen that the flexure hinges 6 are uniformly distributed over the periphery of the platform 5. The width of the flexure hinges 6, which hinges also consist of a semiconductor material, is in the range of 10 μm to 100 μm. The width of the connecting pieces is in the range of 30 μm to 60 μm.

Figure 3:
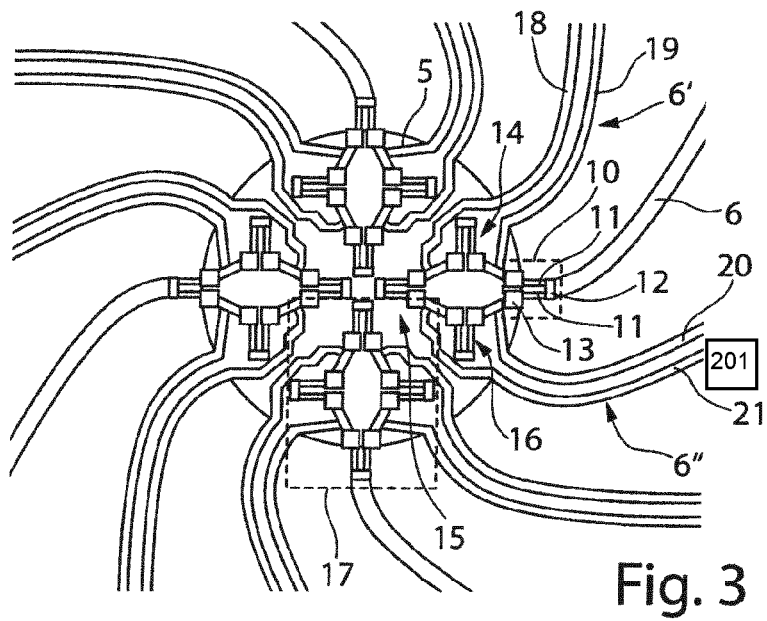
FIG. 3 is a plan view of a detail of the system.

It can be seen in FIG. 3 that a piezoresistive element 10 is provided on a flexure hinge 6 on the platform side thereof, i.e., on the end to which the platform 5 is fastened, the piezoresistive element 10 being U-shaped. The piezoresistive element 10 comprises two p-doped portions 11 and two highly p-doped portions 12, 13. The piezoresistive element 10 on the flexure hinge 6 is connected to three further piezoresistive elements 14, 15, 16 to form a Wheatstone bridge. A Wheatstone bridge of this kind, comprising four piezoresistive elements, is indicated by reference numeral 17.

In certain embodiments, the piezoresistive elements 10, 14-16 are each the same size and shape and are rotated by 90° relative to one another so as to always achieve similar piezoresistive coefficients in the crystalline direction in each case.

The connecting lines 18, 19, 20, 21 extend over flexure hinges 6', 6" that do not carry a piezoresistive element of their own. The connecting lines 18, 19, 20, 21 thus extend over flexure hinges 6', 6" that are adjacent to the flexure hinge 6.

The piezoresistive elements 10, 14, 15, 16 are close together to have a similar temperature. Distortion of the measurement result can thus be prevented. A temperature sensor 200 can be provided on the platform 5 in the region of the piezoresistive elements 10, 14, 15, 16. Alternatively or in addition, a temperature sensor can be arranged on the substrate 4.

The spacing between the piezoresistive elements 10, 14, 15, 16 can be less than 1000 μm, and in certain embodiments is less than 500 μm.

A current can be fed in at two connecting lines 18, 20, while an output voltage can be measured at two connecting lines 19, 21 by means of a measuring device 201.

Four Wheatstone bridges 17 are set out in the embodiment shown. This means that one piezoresistive element 10, respectively, is provided at each of four flexure hinges 6. The four piezoresistive elements 10 on the flexure hinges 6 are at an angle of approximately 90° to one another. Thus, when the platform 5 is tilted purely about one axis, the output signal, in particular an output voltage, of the opposing Wheatstone bridge changes by the same value, but the polarity sign is different. Thus, the direction in which the platform 5 has been deflected can be determined using two Wheatstone bridges. If the platform 5 is moved merely in the z-direction, i.e., raised or lowered, the output signals of the four Wheatstone bridges have the same value and the same polarity sign. The Wheatstone bridges all have the same wiring. In the event of simultaneous lifting and tilting, the position of the platform 5 can be determined in the three degrees of freedom, in each case from the four output signals of the Wheatstone bridges.

Figure 4:
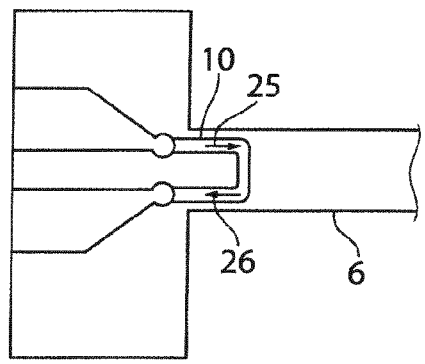
FIG. 4 is a detail view of a U-shaped piezoresistive element.

FIG. 4 shows an embodiment of a piezoresistive element 10. The piezoresistive element 10 is U-shaped. The arrows 25, 26 indicate the current direction.

Figure 5:
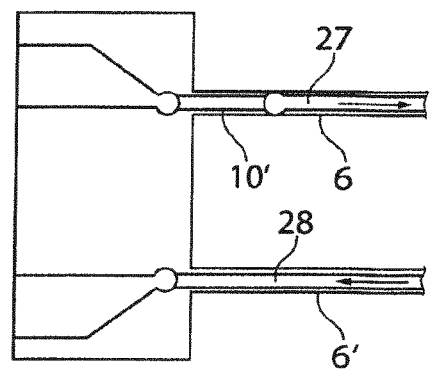
FIG. 5 is a detail view of a piezoresistive element arranged on a flexure hinge.

According to an alternative embodiment in FIG. 5, the piezoresistive element 10' is straight. The element occupies substantially the entire width of the flexure hinge 6. The connecting line 27 is routed on the flexure hinge 6. However, since the piezoresistive element 10' also has to be contacted at the other side, another connecting line 28 is routed over an adjacent flexure hinge 6'. If the piezoresistive element 10' is arranged on the platform side, the connecting line 28 is also routed over the platform to the piezoresistive element 10'. If the piezoresistive element 10' is arranged on the substrate side, the connecting line 28 is also routed over the substrate.

Figure 6:
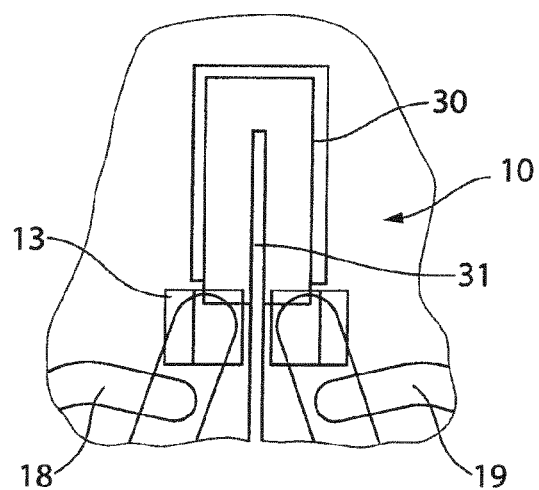
FIG. 6 shows a U-shaped piezoresistive element that is surrounded by trenches.

FIG. 6 is a detail view of a U-shaped piezoresistive element 10. It can be seen here that, for insulation purposes, a trench 30 is provided around the piezoresistive element 10.

A trench 31 is also provided between the limbs of the U-shaped piezoresistive element 10.

OTHER EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. A position sensor system comprising:
   a substrate;
   a platform connected to the substrate by at least one flexure hinge and being movable relative to the substrate; and
   at least one position sensor comprising a plurality of piezoresistive elements connected to one another so as to form an electrical bridge, wherein at least one of the plurality of piezoresistive elements is positioned on the at least one flexure hinge, and at least one other piezoresistive element of the plurality of piezoresistive elements is positioned on one of the substrate and the platform;
   exactly one piezoresistive element positioned on the at least one flexure hinge; and
   three piezoresistive elements positioned on one of the substrate and the platform, wherein the three piezoresistive elements are connected to the one piezoresistive element positioned on the flexure hinge so as to form a Wheatstone bridge.

2. The position sensor system according to claim 1, wherein the at least one piezoresistive element is made of doped crystalline or polycrystalline semiconductor material.

3. The position sensor system according to claim 1, wherein the at least one piezoresistive element is U-shaped.

4. The position sensor system according to claim 1, wherein the at least one piezoresistive element is covered by a light-proof layer.

5. The position sensor system according to claim 1, further comprising at least one temperature sensor positioned on at least one of the substrate and the platform.

6. The position sensor system according to claim 1, wherein the position sensor system comprises a number of flexure hinges that is divisible by two, without a remainder, and wherein the at least one position sensor comprises two position sensors uniformly arranged around the platform.

7. The position sensor system according to claim 1, wherein the position sensor system comprises a number of flexure hinges that is divisible by four, without a remainder, and wherein the at least one position sensor comprises four position sensors uniformly arranged around the platform.

8. The position sensor system according to claim 1, wherein the at least one flexure hinge comprises a plurality of flexure hinges positioned uniformly around the platform and wherein the plurality of piezoresistive elements comprises a respective piezoresistive element positioned on each flexure hinge at the same point on the respective flexure hinge.

9. The position sensor system according to claim 1, further comprising at least one connecting line connected to a piezoresistive element positioned on the platform, wherein the at least one connecting line extends over the at least one flexure hinge or another flexure hinge.

10. The position sensor system according to claim 1, further comprising at least two connecting lines positioned on the at least one flexure hinge or another flexure hinge.

11. The position sensor system according to claim 1, further comprising a connecting line connected to a piezoresistive element positioned on the at least one flexure hinge or another flexure hinge is routed over an adjacent flexure hinge and at least one of the platform and the substrate.

12. The position sensor system according to claim 1, further comprising a mirror positioned on the platform.

13. The position sensor system according to claim 1, further comprising at least one of a magnet and a magnetisable material positioned below the platform and at least one coil provided in the region of the at least one magnet and the magnetisable material.

14. The position sensor system according to claim 1, further comprising a measuring device and an analysis device communicably coupled to the at least one position sensor for measuring and analyzing the signals of the at least one position sensor.

* * * * *